No. 714,014. Patented Nov. 18, 1902.
G. McELROY.
CHECKREIN.
(Application filed Mar. 3, 1902.)
(No Model.) 2 Sheets—Sheet 1.
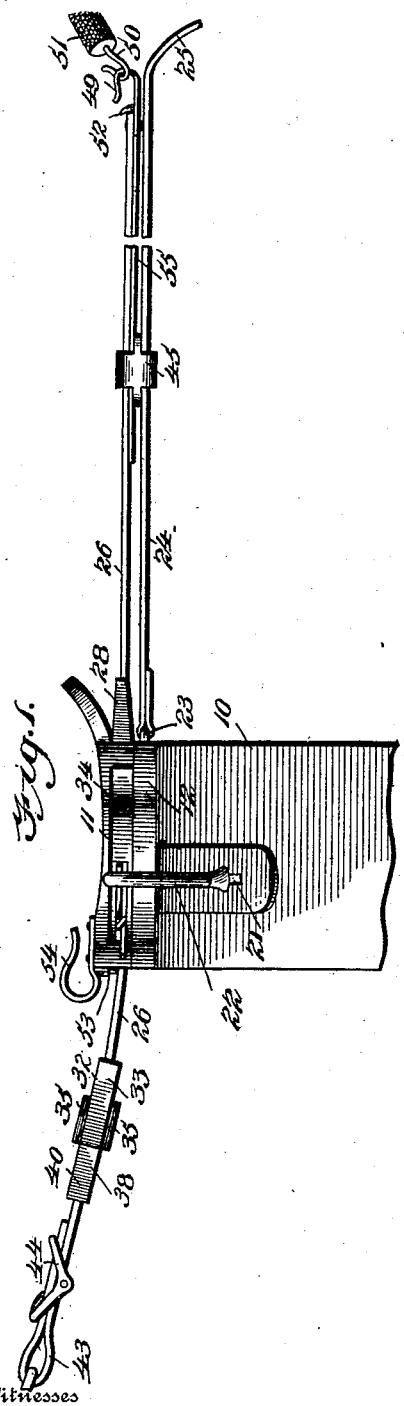
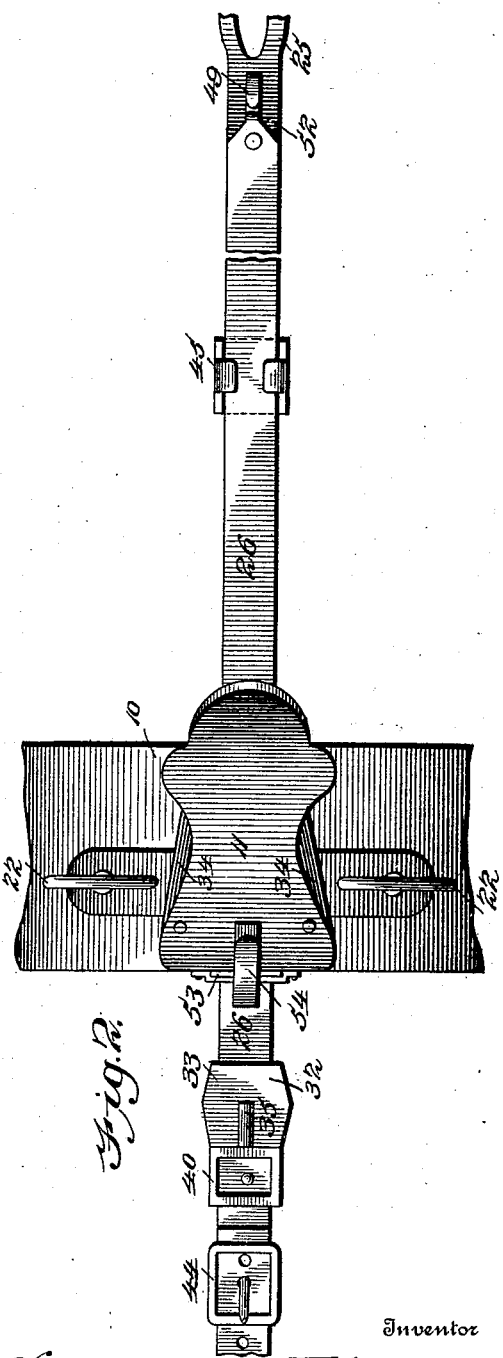
Witnesses
H. G. Dieterich
Chas. S. Hyer
Inventor
George McElroy
By Victor J. Evans
Attorney

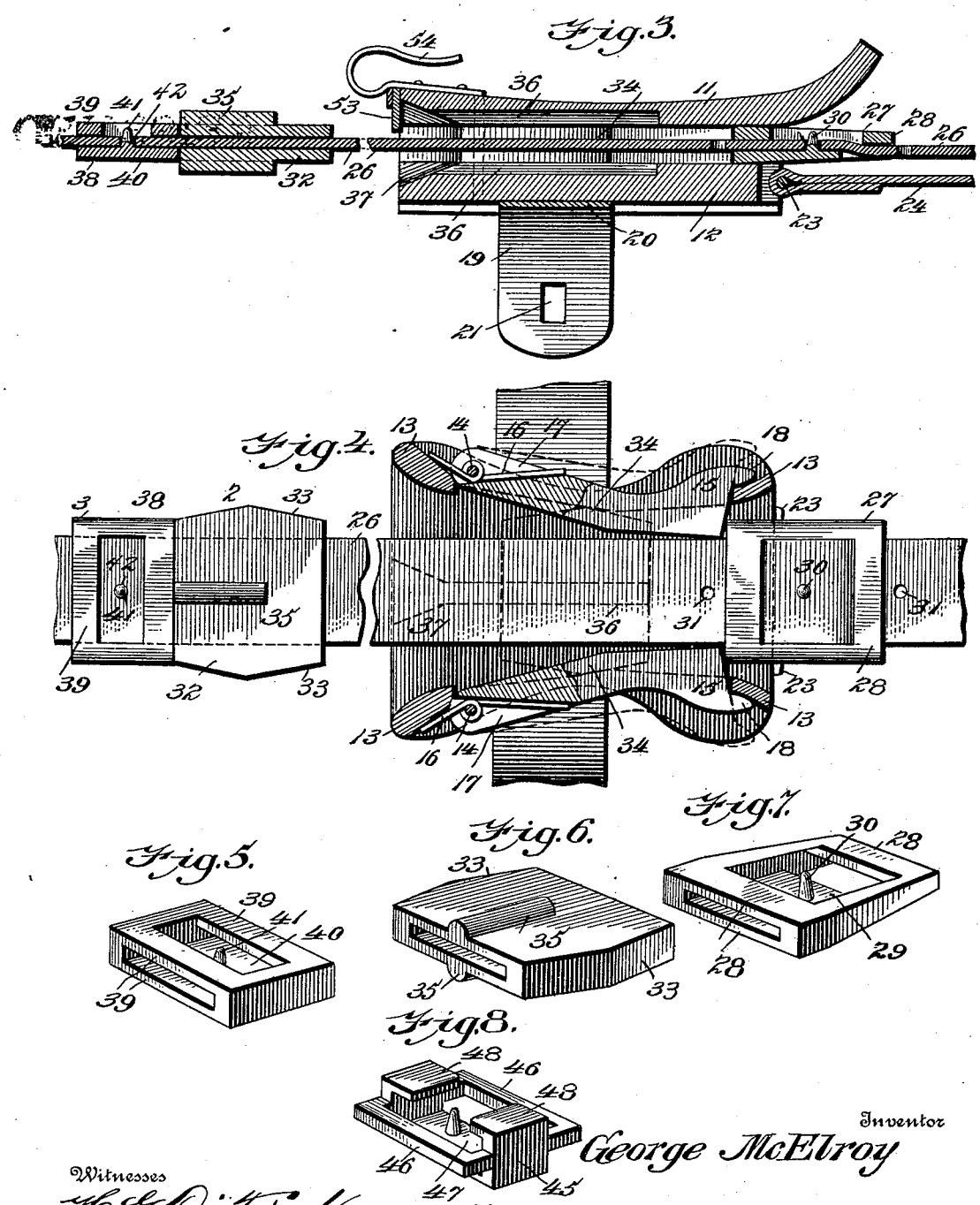

UNITED STATES PATENT OFFICE.

GEORGE McELROY, OF PLAIN CITY, UTAH.

CHECKREIN.

SPECIFICATION forming part of Letters Patent No. 714,014, dated November 18, 1902.

Application filed March 3, 1902. Serial No. 96,571. (No model.)

*To all whom it may concern:*

Be it known that I, GEORGE McELROY, a citizen of the United States, residing at Plain City, in the county of Weber and State of Utah, have invented new and useful Improvements in Checkreins, of which the following is a specification.

This invention relates to checkreins, and particularly to the means whereby the checkrein may be fastened and unfastened.

The aim of the present invention is to provide a checkrein device of such construction as to enable the driver to rein up and unrein the animal without the necessity of getting out of the vehicle. At the same time provision is made for the adjustment of the several parts of the device, so that the checkrein may be lengthened and shortened without disarranging the operating devices.

The improvement is especially designed with reference to the needs of ladies and elderly persons, who are thereby relieved of the necessity of dismounting, the invention being also especially useful in stormy weather or in driving along muddy highways. The ease with which the animal may be unreined further insures the proper watering of the horse upon reaching a suitable supply, as it frequently happens that a horse is allowed to go without water on account of the annoyance and inconvenience of having to dismount from the vehicle in order to uncheck and again check up the animal.

With the above and other objects in view the invention consists in the novel construction, combination, and arrangement of parts hereinafter fully decribed, illustrated, and claimed.

In the accompanying drawings, Figure 1 is a side elevation of a checkrein device constructed in accordance with the present invention and shown applied to a saddletree. Fig. 2 is a plan view of the same. Fig. 3 is an enlarged vertical longitudinal section through the frame of the attachment and the adjacent parts. Fig. 4 is a horizontal section taken just beneath the upper wall of the frame of the attachment. Fig. 5 is a detail perspective view of the adjustable stop. Fig. 6 is a similar view of the spreader. Fig. 7 is a similar view of the adjustable check-loop. Fig. 8 is a similar view of one of the guide-loops.

Like reference-numerals denote like parts in all figures of the drawings.

Referring to the drawings, 10 designates an ordinary harness-saddle or saddletree, to which the frame of the improved attachment is applied. The said frame comprises upper and lower walls 11 and 12, respectively, which are connected at or adjacent to the four corners of the frame by means of vertically-extending webs or posts 13, thereby leaving a clear longitudinal space for the passage of the strap hereinafter described. By constructing the frame in the manner described the sides are left open, and in such open sides are pivotally mounted at 14 a pair of laterally-movable dogs 15, (best illustrated in Fig. 4,) which dogs are normally pressed inward by means of springs 16, which may consist of coils of spring-wire encircling the hinge-pins 14, each of said springs having one terminal extended to bear against one of the webs 13, while the other terminal lies in a recess 17 in the outer surface of the adjacent dog, said terminal bearing against the dog and serving to force the free end of the latter inward. The inward movement of each dog is limited by means of a stop-lip 18, which comes in contact with the adjacent web or post 13, as shown in Fig. 4.

The frame of the attachment is fastened to the saddletree or harness-saddle 10 by providing said frame with oppositely-extending arms 19. These arms are preferably formed in one piece consisting of a curved plate or metal strap 20, riveted or otherwise firmly united to the concaved bottom of the frame and having its opposite end portions slotted, as at 21, to receive the shanks of a pair of fasteners 22, which are preferably in the form of screw-eyes. The shanks of said screw-eyes pass through the slots 21 and screw into the saddletree. The slots 21 admit of the proper relative adjustment of the attachment and saddletree.

Connected firmly to the rear edge of the frame 10 at the point 23 is the usual back-strap 24, which extends rearward and connects with the crupper 25. The checkrein 26 passes longitudinally through the frame of the attachment, between the upper and lower walls 11 and 12 thereof, as clearly shown in Figs. 3 and 4, and has adjustably mounted thereon a check-loop 27, the shape of which is illustrated in Fig. 7, in which it will be seen that said check-loop comprises the oppositely-located parallel end pieces or crossbars 28, between which the checkrein passes, the loop being further provided with a base or bottom 29, from which projects a pin or tongue 30, which may be inserted in any one of a series of openings 31 in the checkrein. This provides for the lengthening and shortening of the checkrein. When adjusted on a rein, the check-loop bears a fixed relation thereto, and in the forward movement of the rein said check-loop is brought to bear against the oppositely-located shoulders formed by the free ends of the dogs 15, as clearly shown in Fig. 4.

Located in advance of the check-loop 27 is what I term a "spreader" 32. The spreader is in the form of a flat sleeve surrounding the checkrein 26 and comprises oppositely-located and reversely-inclined edges 33, which, as the checkrein is drawn rearward, operate against the rearwardly-converging inner edges 34 of the dogs, thereby forcing the dogs apart and out of engagement with the check-loop 27. In order to limit the rearward movement of the spreader 32, the latter is provided on opposite sides with ribs or lugs 35, which form at each end shoulders. The inner surfaces of the upper and lower walls 11 and 12 of the frame 10 are longitudinally recessed or grooved, as shown at 36, to admit the ribs or lugs 35, while the outer or forward ends of said recesses are flared, as shown at 37, to insure and facilitate the entrance of the ribs 35 into their respective recesses. The ribs and recesses act to center and properly guide the spreader as it is drawn into the frame of the attachment, and in this way both of the dogs are simultaneously actuated in opposite directions to an equal extent and with an equal movement. The spreader keeps the dogs apart until the checkrein is drawn forward as the animal reaches downward to drink, whereupon the check-loop 27 comes in contact with the spreader 32, passing between the dogs and forcing the spreader ahead of it. This releases the checkrein and gives sufficient slack to allow the animal to drink.

In advance of the spreader 32 there is arranged an adjustable stop 38, which is similar in construction to the check-loop 27, comprising the oppositely-located parallel end bars 39, base or bottom 40, and pin or tongue 41, the latter being adapted to be entered in any one of a series of holes 42 in the checkrein 26. As the checkrein is drawn rearward, the stop 38 comes in contact with the spreader and forces the latter between the pivoted dogs for the purpose above described. At its forward end the checkrein is looped, as shown at 43, to connect with the bridle and provided with a suitable adjusting-buckle 44.

In rear of the attachment-frame 10 and in rear of the check-loop 27 the checkrein 26 passes through a guide-loop 45, which is mounted on the back-strap 24, as shown in Figs. 1 and 2. This guide-loop is illustrated in detail in Fig. 8 and comprises the parallel arms 46, which lie between the checkrein and back-strap, the bottom bar 47, which passes beneath the back-strap, and the inwardly-extending lips or ears 48, which extend over the top of the checkrein, as shown in Fig. 2, and serve to guide said rein in its sliding movements. The guide-loop 45 may be located at any convenient point in the length of the back-strap, and more than one of said guide-loops may be employed if deemed necessary.

The checkrein has connected to its rear extremity a hook 49, which is adapted to be engaged by a similar hook, loop, or eye 50, which for convenience is shown applied to the butt-end of a whip-stock 51. The hook 49 is permanently attached to the checkrein 26, and also provided with a stop projection 52 for preventing the checkrein from passing entirely through the frame of the attachment.

At the front of the frame 10 is a yielding check 53, composed, preferably, of leather, which extends partially across the entrance to one of the recesses or grooves 36, said check serving to hold the spreader back in case it catches on the checkrein or fails to work freely thereon.

54 represents an extra checkrein-hook for use in case of accident or emergency.

55 designates a metal guide-strip extending lengthwise of a portion of the checkrein for the purpose of keeping the rein straight, preventing said rein from buckling, and causing it to slide freely and smoothly through the guide-loop 45.

When it is desired to rein up the animal, it is only necessary for the driver to engage the hook or eye on the whip-stock with the hook at the rear end of the checkrein and draw said checkrein backward until the check-loop 27 passes behind the shoulders of the dogs 15, the latter springing inward and preventing any forward movement of the checkrein. In order to uncheck the animal, the driver draws the checkrein rearward a sufficient distance to enter the spreader between the dogs and force the dogs outward, so as to disengage the check-loop 27. The animal in lowering his head draws forward on the checkrein, carrying the check-loop 27 forward between the dogs and pushing the spreader ahead of the check-loop.

It will be understood from the foregoing that the operation of checking or unchecking the animal may be accomplished with ease and rapidity by the occupant of the vehicle without necessitating dismounting, and the improvement will be found especially valuable in stormy weather or when traveling on muddy roads.

I do not desire to be limited to the details of construction hereinabove described, and accordingly reserve the right to modify or vary the construction within the scope of the appended claims.

Having thus fully described my invention, what I claim as new, and desire to secure by Letters Patent, is—

1. In a checkrein device, a slidable checkrein, a check-loop and a stop-loop carried thereby, and a spreader slidingly mounted on the checkrein between the check-loop and stop-loop, in combination with an attachment comprising a frame having a longitudinal recess in its inner surface, and spring-pressed dogs for engaging the check-loop, the spreader being provided with a rib or lug which works in the recess in the frame of the attachment.

2. In a checkrein device, a slidable checkrein, a check-loop thereon, a stop on said rein, and a spreader slidably mounted on said rein and provided with a rib or lug, in combination with an attachment comprising a frame having a longitudinal recess to receive the rib or lug on the spreader, a yielding check at the entrance to said groove or recess, and yielding dogs for engaging the check-loop on the checkrein.

In testimony whereof I affix my signature in presence of two witnesses.

GEORGE McELROY.

Witnesses:
A. STOKE,
JAMES N. KIMBALL.